US011194885B1

(12) United States Patent
Parhami et al.

(10) Patent No.: US 11,194,885 B1
(45) Date of Patent: Dec. 7, 2021

(54) INCREMENTAL DOCUMENT OBJECT MODEL UPDATING

(71) Applicant: Google Inc., Mountain View, CA (US)

(72) Inventors: Sepand Parhami, San Jose, CA (US); Malte Ubl, Alameda, CA (US)

(73) Assignee: Google LLC, Mountain View, CA (US)

( * ) Notice: Subject to any disclaimer, the term of this patent is extended or adjusted under 35 U.S.C. 154(b) by 845 days.

(21) Appl. No.: 14/793,282

(22) Filed: Jul. 7, 2015

(51) Int. Cl.
*G06F 16/958* (2019.01)
*G06F 16/957* (2019.01)

(52) U.S. Cl.
CPC ........ *G06F 16/986* (2019.01); *G06F 16/9577* (2019.01)

(58) Field of Classification Search
CPC ................................................... G06F 17/227
See application file for complete search history.

(56) References Cited

U.S. PATENT DOCUMENTS

| 6,122,520 | A  * | 9/2000  | Want ....................... G01S 19/36 455/456.2 |
| 6,332,127 | B1 * | 12/2001 | Bandera ................. G06Q 30/02 705/14.55 |
| 6,745,208 | B2 * | 6/2004  | Berg .................... G06F 17/3061 |
| 7,694,284 | B2 * | 4/2010  | Berg ......................... G06F 8/36 717/137 |
| 8,312,077 | B2 * | 11/2012 | Gale ................... G06F 17/2211 709/203 |
| 9,171,097 | B2 * | 10/2015 | Ceze ................. G06F 17/30902 |
| 2002/0184264 | A1 * | 12/2002 | Berg .................... G06F 17/3061 715/205 |
| 2007/0097138 | A1 * | 5/2007  | Sorotokin ........... G06F 17/2247 345/581 |
| 2008/0005659 | A1 * | 1/2008  | Fujimaki ............. G06F 17/2211 715/234 |
| 2008/0010629 | A1 * | 1/2008  | Berg ........................ G06F 8/36 717/116 |

(Continued)

OTHER PUBLICATIONS

Chedeau, Christopher. "React's diff algorithm", Dec. 28, 2013. <https://calendar.perfplanet.com/2013/diff/> (Year: 2013).*

(Continued)

*Primary Examiner* — Kavita Stanley
*Assistant Examiner* — Tyler Schallhorn
(74) *Attorney, Agent, or Firm* — Lowenstein Sandler LLP (57) ABSTRACT

Computer-implemented techniques can include obtaining a document object model (DOM) tree having a plurality of elements arranged in a plurality of nodes, the DOM tree being generated from a source document for a web page, rendering the web page using the DOM tree, based on an update to the web page, obtaining, by the computing device, a virtual DOM tree having a plurality of virtual elements; establishing a pointer indicative of a current location in the virtual DOM tree, for each specific virtual element of the plurality of virtual elements, determining whether the specific virtual element corresponds to the update and when the specific virtual element corresponds to the update, based on the pointer, obtaining a modified DOM tree by transforming a particular DOM element in the DOM tree corresponding to the specific virtual element, and re-rendering the web page using the modified DOM tree.

21 Claims, 4 Drawing Sheets

(56) References Cited

U.S. PATENT DOCUMENTS

| | | | | |
|---|---|---|---|---|
| 2008/0120368 | A1* | 5/2008 | Gale | G06F 17/2211 709/203 |
| 2011/0258532 | A1* | 10/2011 | Ceze | G06F 17/30902 715/234 |
| 2012/0331374 | A1* | 12/2012 | Fanning | G06F 17/30899 715/234 |
| 2012/0331375 | A1* | 12/2012 | Fanning | G06F 17/30896 715/234 |
| 2013/0212462 | A1* | 8/2013 | Athas | H04L 67/10 715/234 |
| 2013/0227397 | A1* | 8/2013 | Tvorun | G06F 17/227 715/235 |
| 2015/0007019 | A1* | 1/2015 | Li | G06F 17/2235 715/234 |
| 2015/0227566 | A1* | 8/2015 | Tanaka | G06F 17/30327 707/722 |

OTHER PUBLICATIONS

Pollice, Gary et al. "Manual Memory Allocation" and "Depth-First Search" from "Algorithms in a Nutshell", Oct. 2008 O'Reilly. (Year: 2008).*
Block, Steve et al. "DeviceOrientation Event Specification", Dec. 1, 2011, W3C. <http://www.w3.org/TR/2011/WD-orientation-event-20111201/> (Year: 2011).*
Popescu, Andrei et al. "Geolocation API Specification Level 2", Dec. 1, 2011, W3C. <http://www.w3.org/TR/2011/WD-geolocation-API-v2-20111201/> (Year: 2011).*

* cited by examiner

INCREMENTAL DOCUMENT OBJECT MODEL UPDATING

FIELD

The present disclosure is directed to techniques for incremental document object model (DOM) updating.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The document object model (DOM) is a convention for representing a structured document via objects. Structured documents include, for example, hypertext markup language (HTML) documents and extensible markup language (XML) documents. Each element of a structured document corresponds to a DOM node, and some DOM nodes can have children. Thus, the DOM nodes can collectively form a DOM tree that represents both the elements and the relationships between them. When the web page is rendered (e.g., by a web browser), the structured document is loaded into local memory and parsed to obtain the DOM tree and display the web page. The DOM tree can also define how scripting languages (e.g., Javascript) interpret a state of the web browser.

SUMMARY

A computer-implemented technique can include obtaining, by a computing device having one or more processors, a document object model (DOM) tree having a plurality of DOM elements arranged in a plurality of DOM nodes, the DOM tree being generated from a source document for a web page. The technique can include rendering, by the computing device, the web page using the DOM tree. The technique can include based on an update to the web page, obtaining, by the computing device, a virtual DOM tree having a plurality of virtual elements, the virtual DOM tree being different than the DOM tree. The technique can include establishing, by the computing device, a pointer indicative of a current location in the virtual DOM tree. The technique can include for each specific virtual element of the plurality of virtual elements: determining, by the computing device, whether the specific virtual element corresponds to the update, and when the specific virtual element corresponds to the update, based on the pointer, obtaining, by the computing device, a modified DOM tree by transforming a particular DOM element in the DOM tree corresponding to the specific virtual element. The technique can also include re-rendering, by the computing device, the web page using the modified DOM tree.

A computing device having one or more processors configured to perform operations is also presented. The operations can include obtaining a document object model (DOM) tree having a plurality of DOM elements arranged in a plurality of DOM nodes, the DOM tree being generated from a source document for a web page. The operations can include rendering the web page using the DOM tree. The operations can include based on an update to the web page, obtaining, by the computing device, a virtual DOM tree having a plurality of virtual elements, the virtual DOM tree being different than the DOM tree. The operations can include establishing a pointer indicative of a current location in the virtual DOM tree. The operations can include for each specific virtual element of the plurality of virtual elements: determining whether a specific virtual element corresponding to the update, and when the specific virtual element corresponds to the update, based on the pointer, obtaining a modified DOM tree by transforming a particular DOM element in the DOM tree corresponding to the specific virtual element. The operations can also include re-rendering the web page using the modified DOM tree.

A non-transitory computer-readable medium is also presented. The computer-readable medium can have instructions stored thereon that, when executed by one or more processors of a computing device, cause the computing device to perform operations. The operations can include obtaining a DOM tree having a plurality of DOM elements arranged in a plurality of DOM nodes, the DOM tree being generated from a source document for a web page. The operations can include rendering the web page using the DOM tree. The operations can include based on an update to the web page, obtaining, by the computing device, a virtual DOM tree having a plurality of virtual elements, the virtual DOM tree being different than the DOM tree. The operations can include establishing a pointer indicative of a current location in the virtual DOM tree. The operations can include for each specific virtual element of the plurality of virtual elements: determining whether a specific virtual element corresponding to the update, and when the specific virtual element corresponds to the update, based on the pointer, obtaining a modified DOM tree by transforming a particular DOM element in the DOM tree corresponding to the specific virtual element. The operations can also include re-rendering the web page using the modified DOM tree.

In some implementations, the technique or operations can further comprise determining, by the computing device, a mapping between (i) unique keys associated with the plurality of virtual elements and (ii) the corresponding DOM nodes, and determining, by the computing device, whether the specific virtual element has been added or moved by determining whether the mapping contains a specific unique key corresponding to the specific virtual element.

In some implementations, the technique or operations can further comprise in response to determining that the specific virtual element has been added: creating and inserting, by the computing device, a new DOM node in the current location, and updating, by the computing device, the pointer to the new DOM node.

In some implementations, the technique or operations can further comprise in response to determining that the specific virtual element has been moved: moving, by the computing device, a DOM element corresponding to the specific virtual element to the current location, and updating, by the computing device, the pointer to the DOM node corresponding to the moved DOM element.

In some implementations, the technique or operations can further comprise: identifying, by the computing device, one or more DOM elements that no longer correspond to the plurality of virtual elements, and invalidating, by the computing device, the mapping of the one or more identified DOM elements. In some implementations, the technique or operations can further comprise: determining, by the computing device, that at least one of the one or more identified DOM elements is required during a subsequent render of the web page, and regenerating, by the computing device, the mapping for the at least one of the one or more identified DOM elements.

In some implementations, the technique or operations can further comprise when the specific virtual element corresponds to the update: determining, by the computing device, a type of the specific virtual element, and based on the type of the specific virtual element and the pointer, identifying, by the computing device, the particular DOM element in the DOM tree corresponding to the specific virtual element.

In some implementations, the update to the web page is triggered (i) by a user input, (ii) by a signal from a sensor of the computing device, (iii) by a server via a network, or (iv) by an expiration of a timer.

In some implementations, the virtual DOM tree is the only virtual DOM tree utilized to update the DOM tree.

In some implementations, (i) at least one of the elements of the source document does not have a close tag or (ii) at least one of the elements of the source document has at least one of a conditional class and a conditional attribute.

A computer-implemented technique can include obtaining, by a computing device having one or more processors, a document object model (DOM) tree having a plurality of DOM elements arranged in a plurality of DOM nodes, the DOM tree being generated from a source document for a web page. The technique can include rendering, by the computing device, the web page using the DOM tree. The technique can include determining, by the computing device, a mapping between (i) unique keys associated with virtual elements of the source document and (ii) the corresponding DOM nodes. The technique can also include responsive to an update to the web page: establishing, by the computing device, a pointer indicative of a current location in the source document, identifying, by the computing device, a specific virtual element corresponding to the update based on the mapping, based on the pointer, obtaining, by the computing device, a modified DOM tree by transforming a particular DOM element in the DOM tree corresponding to the specific virtual element, and re-rendering, by the computing device, the web page using the modified DOM tree.

A computing device having one or more processors configured to perform operations is also presented. The operations can include obtaining a DOM tree having a plurality of DOM elements arranged in a plurality of DOM nodes, the DOM tree being generated from a source document for a web page. The operations can include rendering the web page using the DOM tree. The operations can include determining a mapping between (i) unique keys associated with virtual elements of the source document and (ii) the corresponding DOM nodes. The operations can also include responsive to an update to the web page: establishing a pointer indicative of a current location in the source document, identifying a specific virtual element corresponding to the update based on the mapping, based on the pointer, obtaining a modified DOM tree by transforming a particular DOM element in the DOM tree corresponding to the specific virtual element, and re-rendering the web page using the modified DOM tree.

In some implementations, identifying the specific virtual element includes determining whether the specific virtual element has been added or moved by determining whether the mapping contains a specific unique key corresponding to the specific virtual element.

In some implementations, the technique or operations further comprise in response to determining that the specific virtual element has been added: creating and inserting, by the computing device, a new DOM node in the current location, and updating, by the computing device, the pointer to the new DOM node.

In some implementations, the technique or operations further comprise in response to determining that the specific virtual element has been moved: moving, by the computing device, a DOM element corresponding to the specific virtual element to the current location, and updating, by the computing device, the pointer to the DOM node corresponding to the moved DOM element.

In some implementations, the technique or operations further comprise identifying, by the computing device, one or more DOM elements that no longer correspond to the virtual elements of the source document, and invalidating, by the computing device, the mapping of the one or more identified DOM elements. In some implementations, the technique or operations further comprise determining, by the computing device, that at least one of the one or more identified DOM elements is required during a subsequent render of the web page, and regenerating, by the computing device, the mapping for the at least one of the one or more identified DOM elements.

In some implementations, the update to the web page is triggered (i) by a user input, (ii) by a server via a network, or (iii) by an expiration of a timer. In some implementations, the user input is keyboard navigation through a list of items. In some implementations, the computing device is a tablet computer, a mobile phone, or a wearable computer.

In some implementations, (i) at least one of the virtual elements does not have a close tag or (ii) at least one of the virtual elements has at least one of a conditional class and a conditional attribute.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A traditional document object model (DOM) is not optimized for creating a dynamic user interface (UI). In the case of social network web pages, for example, there can be tens of thousands of nodes, such as while a user is scrolling through a content feed. User interaction with these nodes can be challenging due to the difficulty of updating the DOM tree. Such cases can be particularly difficult for computing devices having limited memory, such as tablet computers and mobile phones. One solution to this problem is to construct an alternate version of the DOM tree, which is also known as a "virtual DOM tree." The actual DOM tree is utilized by the web browser to render the web page, whereas the virtual DOM tree reflects requested updates to the web page. In a conventional virtual DOM approach, the virtual DOM tree is compared to another virtual DOM tree that is representative of the current state of the actual DOM tree. In other words, manipulations and comparisons can be performed between these two virtual DOM trees (one representing the actual DOM tree and one reflecting the updates to the web page) to identify differences, which is also known as "diffing." The actual DOM tree can then be changed to reflect these differences, which causes the web page to be re-rendered.

This conventional virtual DOM approach, however, also suffers from inefficiencies and memory issues. For example, the updating of the virtual DOM tree is more than a mere one-time cache and requires substantial long-lived heap memory allocation, particularly for complex animations where high frame-per-second rates are desired (e.g., 60+ frames-per-second). Another complex case is a user input that navigates through a long list of items (e.g., 50 or more items). In such complex cases, the memory allocation for updating of the virtual DOM tree can trigger garbage collection (i.e., reclaiming memory occupied by objects that are no longer in use). This garbage collection can thereby cause a delay. Moreover, using the conventional virtual DOM approach may prevent the use of templates, which can be useful to developers to quickly and efficiently generate DOM trees. For example, templates, such as closure templates, can help developers dynamically build reusable elements by utilizing a simple syntax that is natural for developers and allows them to compose a plurality of smaller components to form the overall UI.

Accordingly, techniques are presented for incremental DOM updating. These techniques aim to update the DOM tree with the fewest number of steps possible, thereby reducing heap memory allocation and improving web page update performance due to reduced or no garbage collection. Instead of building and modifying a virtual DOM tree for subsequent comparison to and updating of the actual DOM tree, these techniques can transform the actual DOM tree without allocating an additional virtual DOM tree (i.e., only one virtual DOM tree is utilized). Thus, there can be almost no long-lived heap memory allocation aside from the single long-lived actual DOM tree. For example, performing M updates on a DOM tree of size N involves O(N) heap memory allocations compared to O(N*M) heap memory allocations for a virtual DOM library. Further, these techniques can also be very flexible with respect to various aspects of the source document, thereby allowing developers to utilize templates. For example, elements without close tags can still function, and conditional classes and/or attributes may be used.

Figure 1:
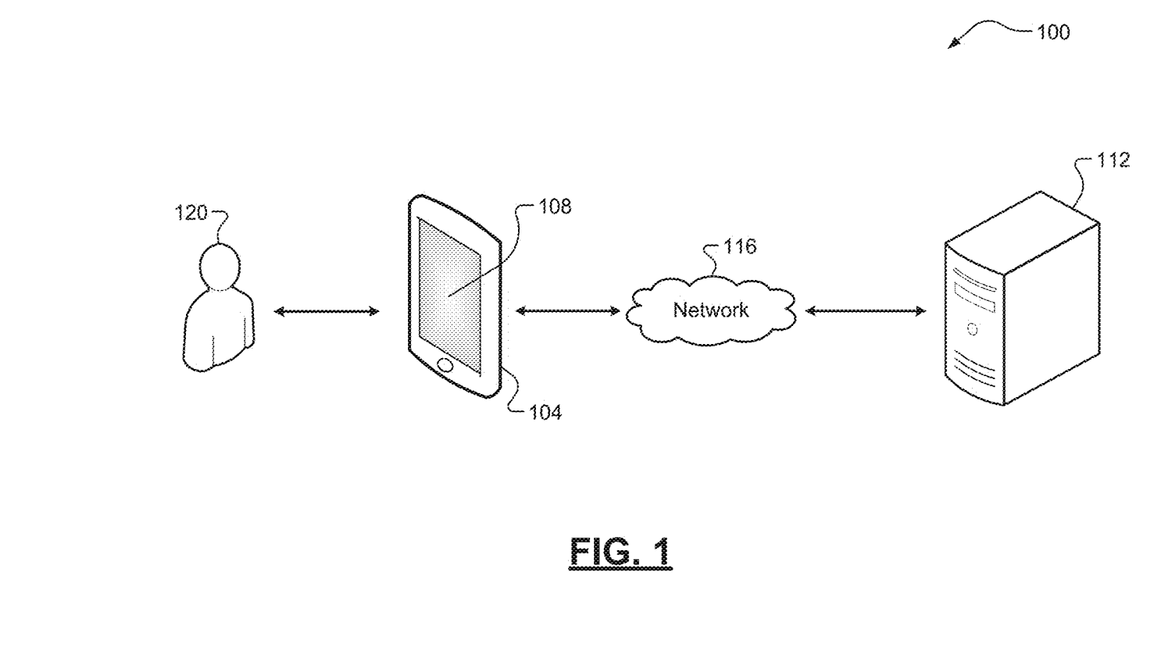
FIG. 1 is a diagram of an example computing system including an example computing device according to some implementations of the present disclosure.

Referring now to FIG. 1, an example computing system 100 is illustrated. The computing system 100 can include an example computing device 104 according to some implementations of the present disclosure. Examples of the computing device 104 include, but are not limited to, a desktop computer, a laptop computer, a tablet computer, and a mobile phone. The incremental DOM updating techniques of the present disclosure may be particularly useful for mobile computing devices that have limited memory (e.g., tablet computers, mobile phones, and wearable computers). These devices are primarily utilized by users to surf web pages and execute applications, both of which are areas where updates are repeatedly required. Moreover, these devices may have a slower or otherwise limited network connection, which may make it particularly challenging when communicating with a server for an update. The computing device 104 can include a user interface 108, such as a touch display. The computing system 100 can further include a server 112 in communication with the computing device 104 via a network 116. The computing device 104 can be operated by a user 120.

The server 112 can be a web server configured to host and provide a source document for a web page to the computing device 104. The server 112 can also be another server configured to host and provide a web application associated with the web page to the computing device 104. In one implementation, the computing device 104 is configured to perform client-side rendering of the web page. In other implementations, the server 112 is configured to perform server-side rendering of the web page. It will be appreciated, however, that any combination of client-side and server-side rendering can be implemented. In some implementations, the server 112 can trigger an update to the web page at the computing device 104. The update could also be triggered locally, however, such as in response to a user input (e.g., navigating a long list of items), in response to a signal by a sensor of the computing device 104 (e.g., a global positioning system (GPS) or orientation sensor), or in response to the expiration of a timer.

Figure 2:
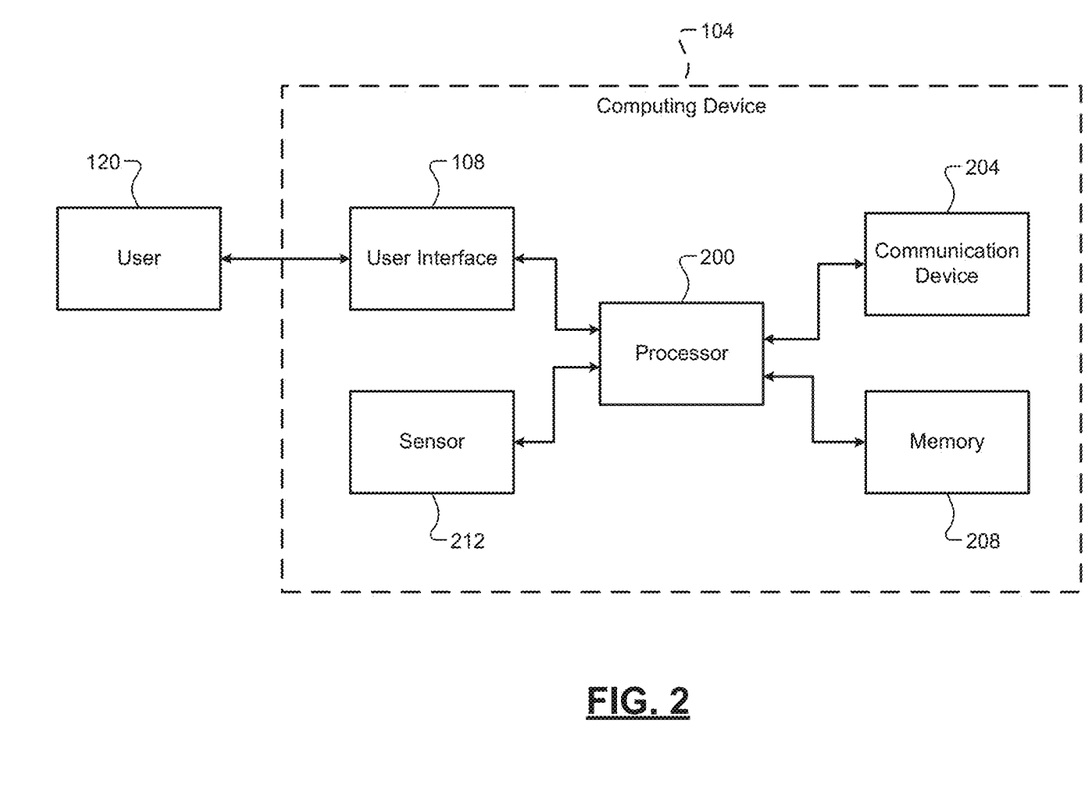
FIG. 2 is a functional block diagram of the example computing device of FIG. 1.

Referring now to FIG. 2, a functional block diagram of the computing device 104 is illustrated. As discussed above, in one implementation the computing device 104 is a mobile computing device, such as a tablet computer or a mobile phone. The computing device 104 can include the user interface 108, a processor 200, a communication device 204, and a memory 208. In one implementation, the user interface 108 includes a touch display configured to both output information and receive touch input. It will be appreciated that the user interface 108 could include other user input devices (not shown), such as a physical keyboard and/or buttons. In some implementations, the computing device 104 may include a sensor 212, such as a GPS sensor or an orientation sensor. A GPS signal (e.g., the user's location) or an orientation signal (e.g., portrait vs. landscape) could trigger an update to the web page.

The term "processor" as used herein refers to both a single processor and two or more processors operating in a parallel or distributed architecture. The processor 200 can be configured to control operation of the computing device 104. Example functions performed by the processor 200 include, but are not limited to, loading/executing an operating system of the computing device 104, processing input/output at the user interface 108, controlling communication via the communication device 204, and controlling read/write operations at the memory 208. The communication device 204 can be any suitable device, such as a transceiver, that is configured for communication via the network 116. The memory 208 can be any suitable storage medium (flash, hard disk, etc.) configured to store information at the computing device 104. The processor 200 can also be configured to perform at least a portion of the incremental DOM updating techniques of the present disclosure, which are discussed in greater detail below.

The term "virtual element" herein refers to a markup document element, such as a hypertext markup language (HTML) element. For example only, the HTML anchor element could be as follows: <a href="http://www.targetwebpage.com">Target Web Page</a>, where the tags <a> and </a> define the beginning and end of the hyperlink tag and the href attribute defines the hyperlink's destination. For scripting languages such as Javascript, elements can also be created, such as by utilizing document.createElement. For example only, the following could be used to create a button with text whereby a text node is appended to a button element:

var btn=document.createElement("BUTTON")//Create a <button> element
   var t=document.createTextNode("CLICK ME")//Create a text node
   btn.appendChild(t); //Append the text to <button>
   document.body.appendChild(btn); //Append <button> to <body>

The computing device 104 can detect an update to the web page that causes a change to the DOM tree. When a difference between a previous attribute value and a new attribute value for an element in the DOM tree is detected, the element's attribute value can be updated to the new value. When there is a change to children of a DOM node, however, the process can be generally divided into two phases: alignment and sweeping. During the alignment phase, the computing device 104 can keep track of a current location in the source document and sequentially step through each element. In order to determine if a specific element has been added, moved, or removed, the computing device 104 can also keep track of a mapping between (i) unique keys associated with the elements ("element keys") and (ii) the corresponding DOM nodes. This mapping can allow the computing device 104 to know if a virtual element has been added (or removed) or it has moved within the parent node by checking if the mapping contains the virtual element's key.

Figure 3:
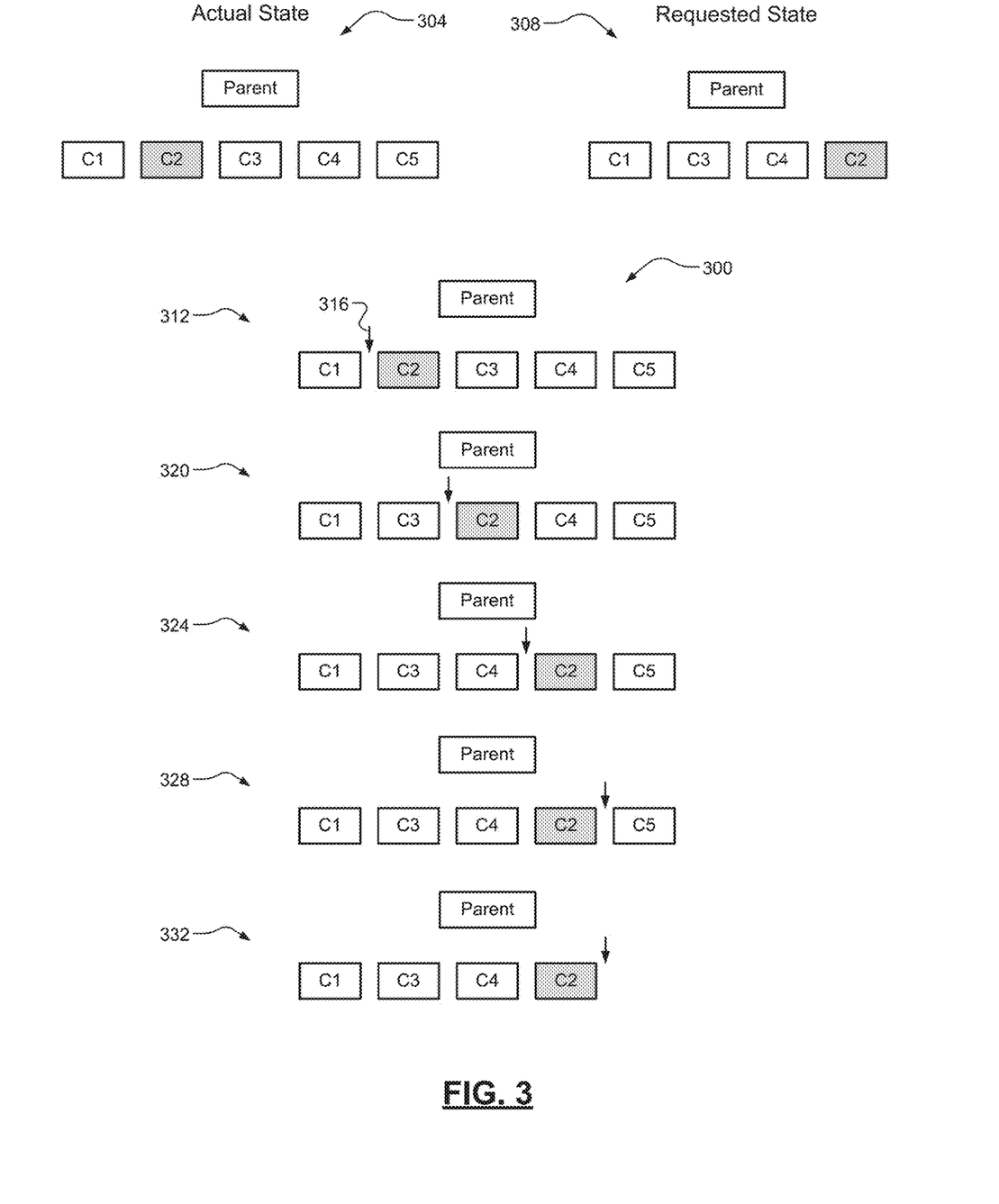
FIG. 3 is a diagram of an example incremental document object model (DOM) reordering process according to some implementations of the present disclosure.

When comparing the current DOM element to the virtual element, a pointer 316 can be used to keep track of what node in the DOM tree is being processed. When the virtual element matches the DOM element, no action may be taken. When the virtual element has been added, a new DOM node can be created and inserted in the current location in the DOM tree and the pointer can be updated to the new DOM node. When the virtual element has been moved, the matching DOM element can be moved up to the current location and the pointer can be updated to the DOM node corresponding to the moved DOM element. After each alignment step, the matching or newly-created DOM node is updated with new attribute values, if any. As the technique incrementally proceeds through the DOM tree, all virtual elements up to the current pointer location are in the correct order.

During the sweeping phase, DOM elements that correspond to any removed virtual elements are themselves removed. As discussed above, the DOM tree and the virtual elements are aligned together during the alignment phase. As a result, everything after the last visited element is a virtual element that has been removed. Thus, sweeping is performed by removing the corresponding elements from the DOM tree. For example, the mapping for each removed element could be removed. In some implementations, the key-element mapping in the parent node could be invalidated and the next time the mapping is required (e.g., on a subsequent render), the key-element mapping could be regenerated.

FIG. 3 illustrates an example incremental DOM reordering process 300. The actual state 304 and the requested state 308 are also illustrated. Due to the way that the programming instructions are specified for the incremental DOM updating, the program never "sees" the requested state 308. Instead, it only knows the correct child node at each step (C1, then C3, then C4, then C2). In contrast, virtual DOM techniques have the full requested state 308. In the incremental DOM reordering, the parent node knows at each step that it has children C1-C5 from before, but it does not know how they are ordered. At 312, a pointer 316 indicates a current location of the program at child node C1. At 320, child node C3 has been moved up or, alternatively, child node C2 has been moved down. Similarly, at 324, child node C4 has been moved up or, alternatively, child node C2 has again been moved down. At 328, the pointer 316 is at moved child node C2. Because C2 is the last visited virtual element, any remaining nodes (e.g., child node C5) are swept away at 332.

Figure 4:
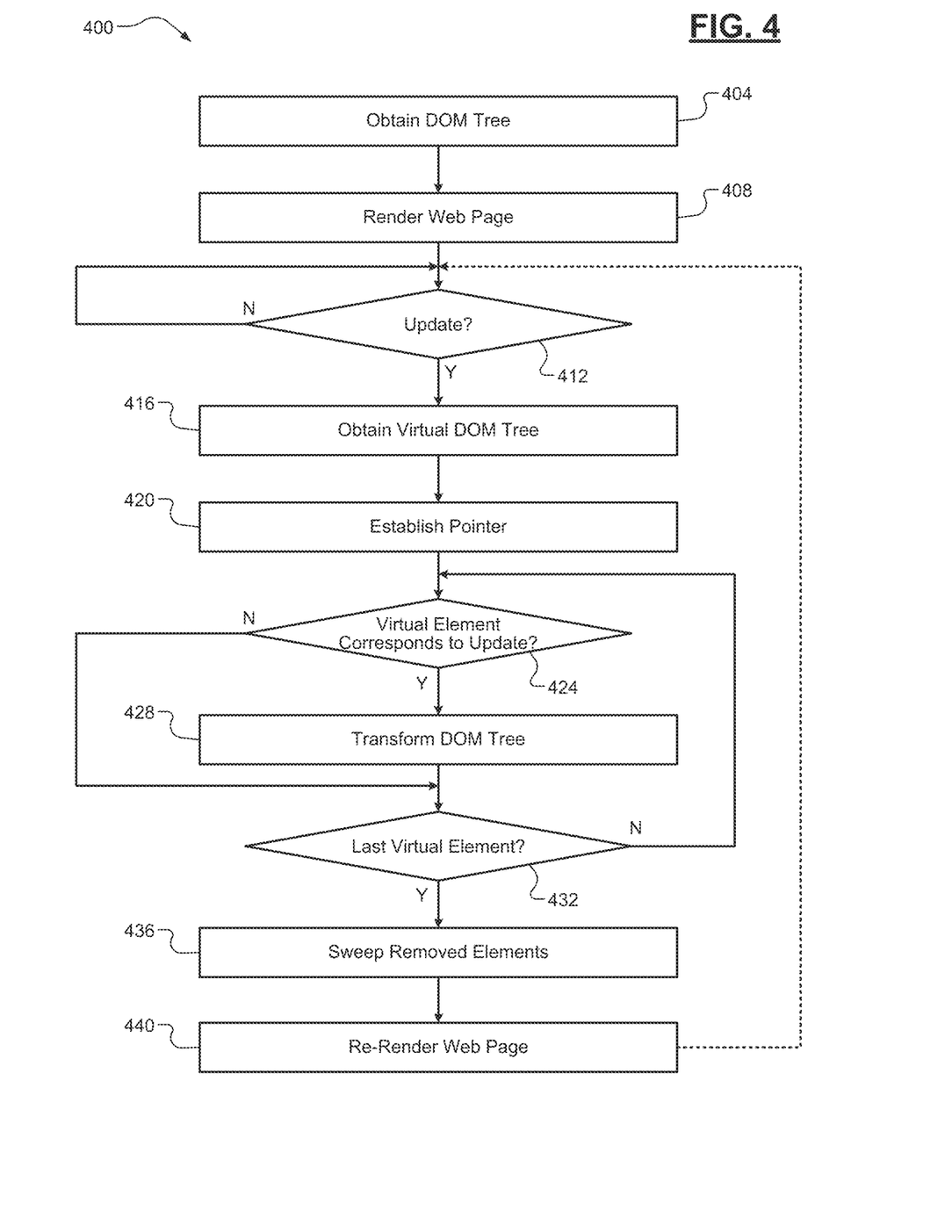
FIG. 4 is a flow diagram of an example technique for incremental DOM updating according to some implementations of the present disclosure.

Referring now to FIG. 4, a flow diagram of an example incremental DOM updating technique 400 is illustrated. At 404, the computing device 104 can obtain a DOM tree having a plurality of elements arranged in a plurality of nodes. The DOM tree can be generated from a source document for a web page. At 408, the computing device 404 can render the web page using the DOM tree. For example, this rendering may be performed by a web browser. At 412, the computing device 104 can detect whether an update to the web page is required. If no update is required, the technique 400 can end or return to 412. If an update is required, the technique 400 can proceed to 416. At 416, the computing device 104 can obtain a virtual DOM tree based on the update, the virtual DOM tree having a plurality of virtual elements and being different than the DOM tree. These virtual elements are different than the DOM elements because the virtual DOM tree reflects the update to the web page. At 420, the computing device 104 can establish a pointer indicative of a current location in the virtual DOM tree.

For each specific virtual element of the plurality of virtual elements, the computing device 104 can perform one or two of operations 424 and 428. At 424, the computing device 104 can determine whether the specific virtual element corresponds to the update (e.g., has the specific virtual element changed). If the specific virtual element does not correspond to the update, the technique 400 can proceed to 432. If the specific virtual element does correspond to the update, the technique 400 can proceed to 428. At 428, the computing device 104 can, based on the pointer, obtain a modified DOM tree by transforming a corresponding element in the DOM tree. At 432, the computing device 104 can determine whether the pointer is at indicating the last virtual element of the virtual DOM tree. If true, the technique 400 can proceed to 436. Otherwise, the technique 400 can loop back to 424. At 436, the computing device 104 can sweep DOM elements that no longer correspond to the plurality of virtual elements. For example, the mapping of these elements could be removed or invalidated. At 440, the computing device 104 can re-render the web page using the modified DOM tree. The technique 400 can then end or return to 412.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
generating, by a client computing device, a document object model (DOM) tree used to render a web page for presentation at the client computing device, the DOM tree comprising a plurality of DOM elements arranged in a plurality of DOM nodes, the DOM tree being generated from a source document received from a web server;
rendering, by the client computing device, the web page for the presentation at the client computing device using the DOM tree;
receiving, by the client computing device, an input that causes an initiation of an update to be performed on the web page;
in response to receiving the input, generating, by the client computing device, a virtual DOM tree that reflects the updated web page, wherein the virtual DOM tree comprises a plurality of virtual elements arranged in a plurality of virtual DOM nodes;
moving, by the client computing device, a pointer to identify a plurality of locations that correspond to the plurality DOM nodes of the DOM tree, wherein the pointer at each of the plurality of locations identifies a DOM node of the plurality of DOM and references a corresponding virtual DOM node of the plurality of virtual nodes;
for each of the plurality of locations identified by the pointer:
comparing the DOM node and the corresponding virtual DOM node;
responsive to determining a difference between the DOM node and the corresponding virtual DOM node, modifying, by the client computing device, the DOM node to match the corresponding virtual DOM node;
discarding, from a memory of the client computing device, the virtual DOM tree; and
re-rendering, by the client computing device, the web page using the modified DOM tree.

2. The computer-implemented method of claim 1, further comprising:
determining, by the client computing device, a mapping between (i) unique keys associated with the plurality of virtual elements and (ii) the corresponding DOM nodes of the plurality of DOM nodes; and
wherein comparing the DOM node and the corresponding virtual DOM node for each of the plurality of locations identified by the pointer comprises determining, by the client computing device, whether a specific virtual element associated with the corresponding DOM node has been added or moved by determining whether the mapping contains a specific unique key corresponding to the specific virtual element.

3. The computer-implemented method of claim 2, further comprising in response to determining that the specific virtual element associated with the corresponding DOM node has been added:
creating and inserting, by the client computing device, a new DOM node in the location identified by the pointer; and
updating, by the client computing device, the pointer to identify a new location of the new DOM node.

4. The computer-implemented method of claim 2, further comprising in response to determining that the specific virtual element associated with the corresponding DOM node has been moved:
moving, by the client computing device, a DOM element corresponding to the specific virtual element to the location identified by the pointer; and
updating, by the client computing device, the pointer to identify a new location of the DOM node corresponding to the moved DOM element.

5. The computer-implemented method of claim 2, further comprising:
identifying, by the client computing device, one or more DOM elements that no longer correspond to the plurality of virtual elements; and
invalidating, by the client computing device, the mapping of the one or more identified DOM elements.

6. The computer-implemented method of claim 5, further comprising:
determining, by the client computing device, that at least one of the one or more identified DOM elements is required during a subsequent render of the web page; and
regenerating, by the client computing device, the mapping for the at least one of the one or more identified DOM elements.

7. The computer-implemented method of claim 1, further comprising:
determining, by the client computing device, a type of a specific virtual element of the corresponding virtual DOM node; and
identifying, by the client computing device, particular a specific DOM element of the DOM tree corresponding to the specific virtual element based on the type of the specific virtual element and the pointer.

8. The computer-implemented method of claim 1, wherein the input that causes the initiation of the update to be performed on the web page comprises a location-indicative signal from a global positioning system (GPS) sensor of the client computing device.

9. The computer-implemented method of claim 1, wherein the virtual DOM tree is the only virtual DOM tree utilized to update the DOM tree.

10. The method of claim 1, wherein the input that causes the initiation of the update to be performed on the web page is based on a portrait-indicative or landscape-indicative signal from an orientation sensor of the client computing device.

11. A client computing device comprising:
a memory; and
a processor, coupled to the memory, the processor to:
generate a document object model (DOM) tree used to render a web page for presentation at the client computing device, the DOM tree comprising a plurality of DOM elements arranged in a plurality of DOM nodes, the DOM tree being generated from a source document received from a web server;
render the web page for the presentation at the client computing device using the DOM tree;
receive an input that causes an initiation of an update to be performed on the web page;
in response to receiving the input, generate, by the client computing device, a virtual DOM tree that reflects the updated web page, wherein the virtual DOM tree comprises a plurality of virtual elements arranged in a plurality of virtual DOM nodes;

move, by the client computing device, a pointer to identify a plurality of locations that correspond to the plurality DOM nodes of the DOM tree, wherein the pointer at each of the plurality of locations identifies a DOM node of the plurality of DOM and references a corresponding virtual DOM node of the plurality of virtual nodes;

for each of the plurality of locations identified by the pointer:

compare the DOM node and the corresponding virtual DOM node;

responsive to determining a difference between the DOM node and the corresponding virtual DOM node, modify, by the client computing device, the DOM node to match the corresponding virtual DOM node;

discard the virtual DOM tree; and re-rendering the web page using the modified DOM tree.

12. The client computing device of claim 11, the processor further to:

determine, by the client computing device, a mapping between (i) unique keys associated with the plurality of virtual elements and (ii) the corresponding DOM nodes; and wherein to compare the DOM node and the corresponding virtual DOM node for each of the plurality of locations identified by the pointer the processor to determine whether a specific virtual element associated with the corresponding DOM node has been added or moved by determining whether the mapping contains a specific unique key corresponding to the specific virtual element.

13. The client computing device of claim 12, wherein in response to determining that the specific virtual element associated with the corresponding DOM node has been added, the processor further to:

create and insert a new DOM node in the location identified by the pointer; and update the pointer to identify a new location of the new DOM node.

14. The client computing device of claim 12, wherein in response to determining that the specific virtual element associated with the corresponding DOM node has been moved, the processor further to:

move a DOM element corresponding to the specific virtual element to the location identified by the pointer; and update the pointer to identify a new location of the DOM node corresponding to the moved DOM element.

15. The client computing device of claim 12, wherein processor further to:

identify one or more DOM elements that no longer correspond to the plurality of virtual elements; and invalidate the mapping of the one or more identified DOM elements.

16. The client computing device of claim 15, wherein the processor further to:

determine that at least one of the one or more identified DOM elements is required during a subsequent render of the web page; and regenerate the mapping for the at least one of the one or more identified DOM elements.

17. The client computing device of claim 11, the processor further to:

determine a type of a specific virtual element of the corresponding virtual DOM node; and identify, by the computing device, particular a specific DOM element of the DOM tree corresponding to the specific virtual element based on the type of the specific virtual element and the pointer.

18. The computing device of claim 11, wherein the input that causes the initiation of the update to be performed on the web page comprises a location-indicative signal from a global positioning system (GPS) sensor of the computing device.

19. The computing device of claim 11, wherein the virtual DOM tree is the only virtual DOM tree utilized to update the DOM tree.

20. The computing device of claim 11, wherein the input that causes the initiation of the update to be performed on the web page is based on a portrait-indicative or landscape-indicative signal from an orientation sensor of the computing device.

21. A non-transitory computer-readable medium comprising instructions stored thereon that, responsive to execution by a processor of a client computing device, cause the processor to perform operations comprising:

generating a document object model (DOM) tree used to render a web page for presentation at the client computing device, the DOM tree comprising a plurality of DOM elements arranged in a plurality of DOM nodes, the DOM tree being generated from a source document received from a web server;

rendering the web page for the presentation at the client computing device using the DOM tree;

receiving an input that causes an initiation of an update to be performed on the web page;

in response to detecting the input, generating, by the client computing device, a virtual DOM tree that reflects the updated web page, wherein the virtual DOM tree comprises a plurality of virtual elements arranged in a plurality of virtual DOM nodes;

moving, by the client computing device, a pointer to identify a plurality of locations that correspond to the plurality DOM nodes of the DOM tree, wherein the pointer at each of the plurality of locations identifies a DOM node of the plurality of DOM and references a corresponding virtual DOM node of the plurality of virtual nodes;

for each of the plurality of locations identified by the pointer:

comparing the DOM node and the corresponding virtual DOM node;

responsive to determining a difference between the DOM node and the corresponding virtual DOM node, modifying, by the client computing device, the DOM node to match the corresponding virtual DOM node;

discarding, from a memory of the client computing device, the virtual DOM tree; and re-rendering the web page using the modified DOM tree.

* * * * *